Figure 1:
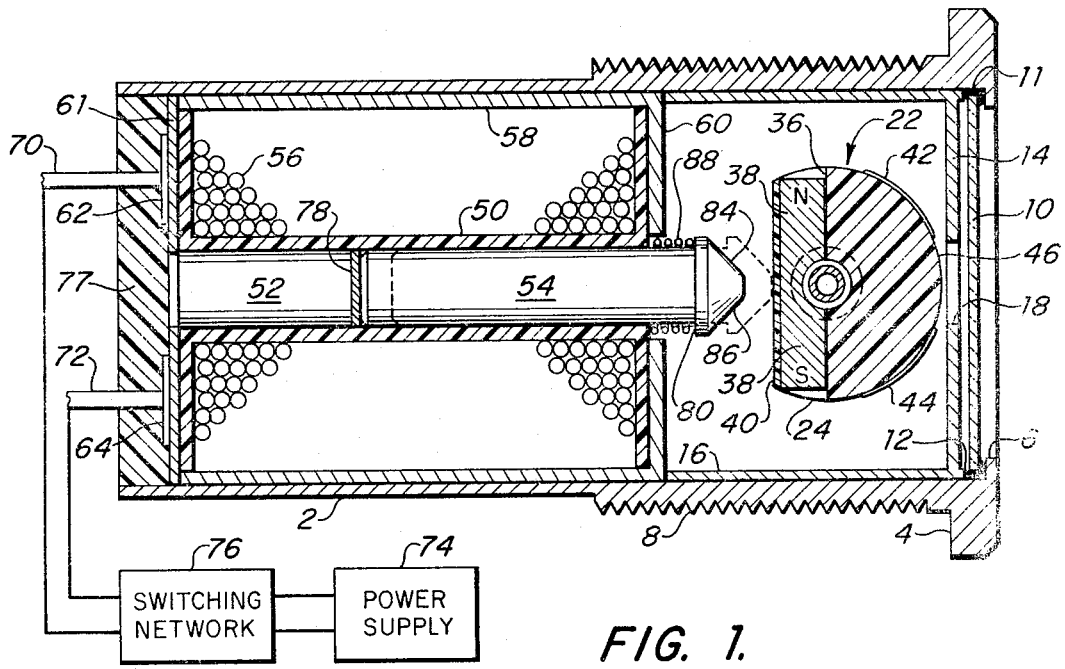

United States Patent

Pihl

[15] 3,680,083
[45] July 25, 1972

[54] THREE POSITION ELECTROMAGNETIC INDICATOR

[72] Inventor: George E. Pihl, Abington, Mass.
[73] Assignee: Miniature Electronic Components Corp., Holbrook, Mass.
[22] Filed: Jan. 25, 1971
[21] Appl. No.: 109,138

[52] U.S. Cl. ..................340/373 R, 340/376 R, 340/378 R
[51] Int. Cl. ...........................................G08b 5/22, G08b 5/26
[58] Field of Search .................................340/373 R

[56] References Cited

UNITED STATES PATENTS

| 1,311,118 | 7/1919 | Geiger | 340/373 |
|---|---|---|---|
| 2,388,448 | 11/1945 | Sundt | 340/373 |
| 3,381,291 | 4/1968 | Simshauser | 340/373 |
| 3,451,055 | 6/1969 | Pihl | 340/373 |
| 3,026,512 | 3/1962 | Baker | 340/373 |

Primary Examiner—Harold I. Pitts
Attorney—Schiller & Pandiscio

[57] ABSTRACT

A three-position indicating device including an indicator member having localized magnetic poles and rotatably mounted for positioning in any one of three positions by an electromagnetic structure. The electromagnetic structure essentially comprises (1) a movable pole piece which is adapted to lock the indicator member in an intermediate "center" position or to unlock the indicator member so that it may be moved to either of two limit positions each determined by engagement of said indicator member with said pole piece, and (2) one or two coils for establishing magnetic fields to effect movement of the pole piece to unlock said indicator member and also to effect movement of the indicator member to one or the other of its two limit positions by interaction of said electromagnetic fields with the localized magnetic poles of said indicator member.

18 Claims, 2 Drawing Figures

PATENTED JUL 25 1972

3,680,083

GEORGE E. PIHL
INVENTOR.
BY Schiller & Pandiscio
ATTORNEYS.

THREE POSITION ELECTROMAGNETIC INDICATOR

This invention relates to miniature electromagnetic indicators and more particularly to indicators capable of indicating three different predetermined conditions.

The primary object of this invention is to provide an improved electromagnetic indicator capable of reliable tertiary indication.

Another object is to provide a new, quick-acting, three position indicator.

A further object is to provide a three-position indicator which is similar in size and in certain parts to miniature electromagnetic indicators of the type set forth in my U.S. Pat. No. 3,451,055.

Still another object of the present invention is to provide a miniature electromagnetic indicator that requires relatively low input power, does not display a false indication under the influence of shock or vibration, is designed to facilitate assembly, and can be made in various sizes.

In a preferred embodiment of the invention, the foregoing and other objects are achieved by a construction comprising a hollow case having a display aperture at one end, a rotatable drum-type indicator member rotatably mounted within said case adjacent to said aperture, the indicator member carrying a permanent magnet and having a peripheral surface with three discrete indicia areas, and electromagnetic means for angularly positioning the indicator member to selectively display said indicia areas in said aperture. The electromagnetic means comprises a pole piece that is movable between a first locking position in which it locks the indicator member in a selected angular position in which one of said indicia areas is displayed and a second limit-setting position in which it allows the indicator member to be rotated to two limit positions in which the other two indicia areas are displayed. The limit positions of the indicator member are determined by engagement thereof with the pole piece. The electromagnetic means further includes a coil disposed so that when energized its resulting magnetic field will magnetically move the pole piece to its limit-setting position. The same magnetic field magnetically impels the indicator member to one or the other of its two limit positions according to the polarity of the field which is determined by the direction of the energizing current through the coil. In an alternative embodiment of the invention, the electromagnetic structure comprises two coils which are oppositely wound so as to produce oppositely oriented magnetic fields when energized with currents of the same polarity.

Figure 2:
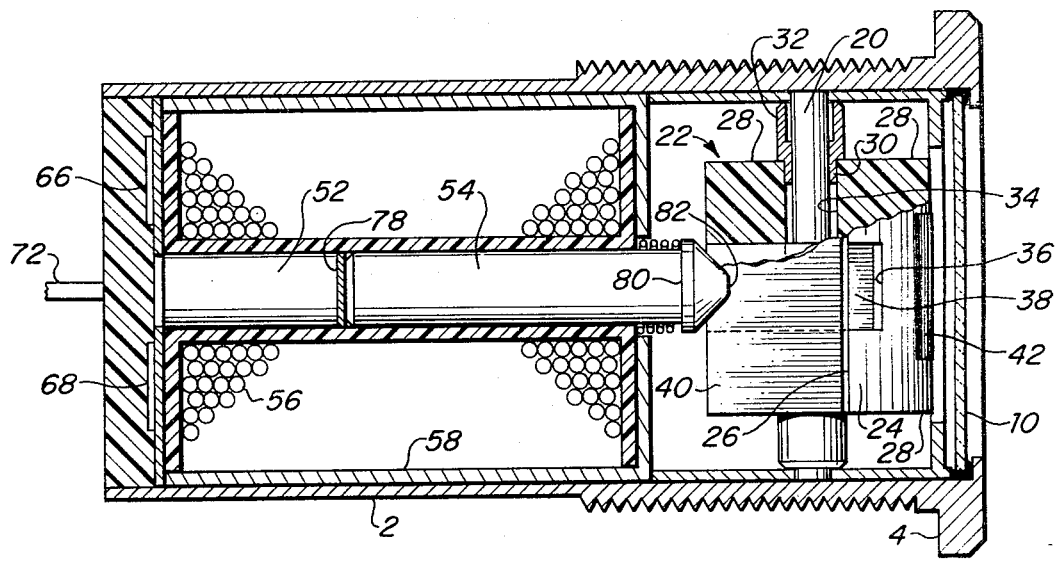

Other objects and many of the attendant advantages of the present invention will become more readily apparent from the following detailed specification when considered together with the accompanying drawing wherein:

FIG. 1 is a longitudinal sectional view of a preferred embodiment of the invention showing the indicator member in its center position; and FIG. 2 is a longitudinal sectional view of the same embodiment taken at right angles to the view of FIG. 1, but with the indicator member in one of its two limit positions.

Turning now to the figures, the illustrated embodiment comprises a cylindrical case 2 that preferably is made of a suitable non-magnetic metal such as aluminum but also may be made of a strong plastic material. The case is formed with open ends, one of which has an external flange 4 and an internal lip 6. The flange 4 is provided for mounting the indicator to an instrument panel by means, for example, as a nut (not shown) screwed onto a threaded portion 8 of the case adjacent to the flange 4. The internal lip 6 functions as a shoulder for a disc 10 that functions as a window and which may be made of clear glass or other transparent material such as Lucite or a polycarbonate resin. The disc 10 is secured in place against the lip 6 by a suitable potting compound as at 11 and/or by the pressure exerted by a spacer ring 12 which is formed as an integral part of the end surface 14 of an inverted cylindrical cup 16 which may be made of a non-magnetic metal such as aluminum or a suitable rigid plastic. The end surface 14 has a rectangular slot 18 which functions as a viewing aperture.

The side wall of cup 16 has two diametrically opposed holes (FIG. 2) to accommodate the ends of shaft 20 which preferably is made of a non-magnetic stainless steel alloy. Mounted on the shaft 20 is an indicator member 22 having the general shape of a drum. Preferably, the indicator member is made of plastic material such as an epoxy resin. The indicator member has a circularly curved surface 24 which terminates in a flat surface 26 which in cross section appears as the chord of the circle formed by extending the outline of the curved surface 24. The opposite ends of the indicator member terminate in flat surfaces 28.

The indicator member is rotatably supported on shaft 20 by two bearing members each comprising a sleeve portion 30 which fits in a center bore 34 and a spacer portion 32 which engages and extends between the indicator member and the side wall of cup 16. Preferably the bearing members are made of brass and the outer ends of their spacer portions are bevelled as shown to facilitate engagement with the cylindrical side wall of cup 16. The bearing members allow the indicator member to rotate on the shaft while preventing any substantial movement between the indicator member and shaft 20 in an axial or radial direction.

The flat surface of the indicator member is notched as shown at 36 to accommodate a single elongate bar magnet 38 of rectangular cross section which preferably is cemented in place. The magnet is polarized longitudinally and is mounted so that its longest dimension extends transversely of the shaft. To increase the size of the magnet that may be accommodated without increasing the overall size of the indicator drum, it is preferred to notch the magnet so that it will accommodate part of the shaft as shown in FIG. 1. The flat surface 26 of the indicator member and the corresponding side surface of magnet 38 are covered fully by a sheet of non-magnetic material 40 which preferably is made of a plastic such as Teflon and is cemented in place. The purpose of the sheet 40 is to assure a non-magnetic gap between the indicator member and the electromagnetic assembly as explained hereinafter.

The curved surface of the drum is characterized by three discrete indicia areas. For convenience of illustration, two of the indicia areas are illustrated as raised portions 42 and 44 on opposite sides of the third indicia area 46 which is not raised. In practice the indicia areas need not be raised or depressed portions but may be, for example, merely areas of different colors with the difference in colors demarcating the border between adjacent areas. It also is contemplated that the indicia areas may be the same color but characterized by different printed legends which may be in various forms, e.g., words or symbols or other suitable markings. Thus, for example, each of the three indicia areas may be characterized by a different one of the following words: "ON," "OFF," and "FAIL." In any event, the indicia bearing areas and the aperture 18 must be sized so that only one indicia area at a time is visible via the aperture when the indicator member is positioned in any one of its three display positions as hereinafter described.

Positioning and movement of the indicator member is achieved by energization of the electromagnetic assembly which will now be described. Essentially, this assembly comprises a bobbin 50 which is made of a non-magnetic electrically insulating material, preferably a plastic such as nylon or an epoxy resin. The bobbin body is hollow to accommodate two magnetic pole pieces or cores 52 and 54 made of a suitable magnetic alloy such as Ledloy A. Wound on the bobbin is a coil of insulated wire 56. The bobbin is mounted in a coil case 58 which is made of a magnetic material such as Ledloy A. The coil case is open at one end and the other end has an inturned flange 60 which functions as a stop for the bobbin and also defines a circular hole to accommodate the pole piece 54. The coil case also holds cup 16 tightly against the window disc 10.

Also mounted within the case is a printed circuit board 61 which is of annular configuration and is provided with four conductive lands 62, 64, 66, and 68 which are displaced 90° from one another. In this embodiment where only one coil is carried by the bobbin, lands 66 and 68 are not used. Two electrically conductive terminal pins 70 and 72 are soldered or welded to lands 62 and 64. The ends of the coil 56 are brought out through matching pairs of holes (not shown) in the adjacent end of the bobbin and the printed circuit board and soldered to lands 62 and 64. As a result, the coil may be energized by coupling a power supply 74 across the two terminal leads via a switching network 76. The printed circuit board is sealed in the case 2 by a suitable non-conductive potting compound 77, e.g., an epoxy compound.

The pole piece 52 is fixed within the hollow bobbin. Preferably, it is cemented in place by means of an epoxy resin. The other pole piece 54 is movable within the bobbin. A disc 78 of a suitable non-magnetic material such as Teflon is cemented to the inner end of pole piece 52. The disc 78 assures that a gap will always exist between the two pole pieces. The opposite end of pole piece 54 projects into cup 16 and is provided with an enlargement which forms a shoulder 80 and is characterized by a flat end surface 82. The enlargement is frusto-conical (its conical surface preferably is tapered at an angle of about 45° to the axis of the pole piece) so that diametrically opposed portions 84 and 86 of its conical surface can function as stops for the indicator member when the device is operated as hereinafter described. As an alternative measure, the portions 84 and 86 may be flats formed in the conical surface, but in such case it is necessary to provide means for preventing rotation of the pole piece on its axis so as to assure that the flats will be in the correct position to be engaged by the flat side of the indicator member when the latter is rotated to either of its limit positions. Non-rotation of the pole piece may be achieved by providing a longitudinal groove or rib on the pole piece and a complementary rib or groove on the inside surface of the bobbin so as to provide a sliding keyway (i.e., tongue-in-groove) connection between the two members. It also is feasible for the end of the pole piece to be rounded instead of terminating in the flat surface 82. Preferably, the enlargement has a frusto-conical shape as shown.

The pole piece 54 is surrounded by a compression spring 88 disposed so that one end engages the shoulder 80 and the opposite end engages the adjacent end of the bobbin exposed in the opening defined by the flange on the coil case. The spring 88 urges the pole piece 54 away from the Teflon spacer disc 78 toward the dotted line position shown in FIG. 1. So long as the coil 56 is deenergized, the pole piece 54 is urged toward the shaft 20 and its flat end surface 82 is maintained in engagement with the Teflon sheet 40 on the flat side of the indicator member with sufficient force to hold the indicator member in the display position that it occupies in FIG. 1, in which position the intermediate or center indicia area 46 is aligned with and is visible in the aperture 18. The length of the pole piece 54 is such that it can be moved from the dotted line position to the position shown in full lines in FIG. 1, or even further to engage the Teflon spacer disc 78. When the pole piece 54 is in this withdrawn position, the indicator member is free to be rotated clockwise or counterclockwise to move one or the other of the indicia areas 42 and 44 into display position, i.e., into alignment with the aperture 18. Rotation of the indicator member clockwise or counterclockwise from the position of FIG. 1 is limited by its engagement with the diametrically opposed surface portions 84 and 86 of pole piece 54 when the latter is retracted. In one limit position the indicia area 42 is aligned with aperture 18 and in the other limit position the indicia area 44 is aligned with aperture 18.

Retraction of the pole piece 54 and rotation of the indicator member to one or the other of its limit positions is achieved by energizing the coil 56. The direction of rotation of the indicator member from the display position of FIG. 1 is determined by the polarity of the magnetic field produced by energizing the coil. When the coil is energized, the pole pieces 52 and 54 are magnetized, and the magnetic polarities of these pieces are determined by the direction of the energizing current. Assume, for example, that the indicator member 22 is in the position shown in FIG. 1, and the coil 56 is energized such that its magnetic field will cause the enlargement on the outer end of pole piece 54 to be a North Pole. The magnetic field will cause the pole piece 54 to be withdrawn into the bobbin. At the same time, the South Pole S of the permanent magnet 58 will be attracted to the pole piece 54, while its North Pole N of magnet 58 will be repelled. Consequently, the indicator member 52 is magnetically impelled to rotate clockwise from the position shown in FIG. 1 until its Teflon sheet 40 engages the conical surface portion 86 of the pole piece. The indicator member will remain in this display position (in which the indicia area 42 is visible in the aperture 18) so long as the coil remains energized. If the coil is deenergized, its magnetic field will collapse and spring 88 will urge the pole piece back to its original position. This return movement of the pole piece will cause the indicator member to rotate counterclockwise. Despite the continuing attraction of the pole piece for the permanent magnet, the indicator member will resume its original position and will be held there by the pole piece because of the continuing force exerted by the spring 88. If now the coil is reenergized with an opposite current, the pole piece 54 will again be retracted. However, its enlargement will now have a polarity opposite to that produced by the previous excitation of the coil, with a result that the North pole of the permanent magnet 38 will be attracted to the pole piece and the indicator member will rotate counterclockwise to its other limit position in which the indicia area 44 is visible in the aperture 18. Again the indicator member will remain in this new position so long as the coil is energized. Deenergizing the coil will cause the indicator member to return to its original position. It is to be noted that it is also possible to shift the indicator member from one limit position to the other without stopping at the intermediate display position. This is achieved by terminating the flow of current in one direction and immediately applying to the coil a current that flows in the opposite direction. If the current reversal is effected rapidly, the pole piece will remain retracted.

In the typical installation, the indicator device described above normally is in a deenergized state and is selectively switched to one of its two other display positions in response to a change in some exterior condition. Alternatively, it may be installed so that normally coil 56 is energized and either indicia area 42 or indicia area 44 is displayed. It also is contemplated that the switching network may be adapted to alternatively connect coil 56 to two separate power supplies, one for causing the indicator member to rotate clockwise and the other for causing it to rotate counterclockwise. The switching network 76 may be of any suitable arrangement effective to cause the indicator to assume any one of its three display positions. By way of example, the indicator member may be adapted to display "ON," "OFF," or "FAIL" and the switching network 76 may be operated by appropriate sensors disposed to monitor a given apparatus (such as an electromechanical control system in an aircraft) to determine whether it has been switched on, and if so, whether it is in a fail condition.

As indicated above, it is also possible to have two oppositely wound coils on the bobbin. The single coil arrangement shown in the drawings is used when currents of opposite polarities are available to operate the indicator. Winding two coils on the same bobbin is resorted to when it is desired to use current signals of identical polarity to shift the indicator to its two limit positions. If two coils are used, the terminals of the second coil are connected to the lands 66 and 68 and two additional terminal pins (not shown) are connected to the same lands. Alternatively, only three lands (and only three terminal pins) may be used, with one land being connected to both coils and one terminal serving as a common.

As used herein the term "indicia area" designates a discrete portion of the indicator member which by virtue of one or more indicia is visually distinguishable. The term "indicia" shall be construed to include color, legends, (such as letters, numerals, arbitrary symbols, and words) and other identifying characteristics such as lands or depressions in the surface of the indicator member.

Still other modifications of the device are possible. Thus, the device may be provided with luminescent indicia or may be used to display only two different indications (e.g., by applying or not applying a signal current of fixed polarity) or the curved surface of the indicator member may be replaced by three flat surfaces angularly disposed with respect to one another like the sides of a polygon, notably a hexagon or octagon.

What is claimed is:

1. A three-position indicator comprising a shaft, an indicator member rotatably mounted on said shaft, said indicator member having a surface with first, second and third indicia, a permanent magnet attached to said indicator member, an elongate pole piece made of magnetic material disposed perpendicular to said shaft, said pole piece being slidable lengthwise between a first position in which one end thereof is relatively near to said shaft and a second position in which said one end is relatively far from said shaft, spring means biasing said pole piece toward said first position, electromagnetic means surrounding said pole piece for magnetizing said pole piece with either of two magnetic fields of opposite polarity so as to cause rotation of said indicator member in one direction or in the opposite direction by magnetic repulsion and attraction of said magnet, said electromagnetic means also being disposed so that when energized it will magnetically force said pole piece to said second position, said one end of said pole piece being shaped so as to engage and lock said indicator member against rotation when in said first position and to intercept and thereby provide first and second limit positions for said indicator member when in said second position, and means defining an aperture for viewing said indicia, said first indicia being visible through said aperture when said indicator member is locked by said pole piece and said second and third indicia being visible through said aperture when said indicator member is in its first and second limit positions respectively.

2. An electromagnetic indicator comprising an indicator member having localized magnetic poles and three discrete indicia areas, means defining an aperture for viewing individual ones of said indicia areas, means supporting said indicator member for rotation on an axis disposed so that said indicator member may be rotated to any one of first, second, and third display positions in each of which a different indicia area is disposed for viewing through said aperture, and electromagnetic means for selectively positioning said indicator member in any one of said first, second, and third display positions, said electromagnetic means including (a) electrically energizable means for selectively establishing either of two oppositely polarized magnetic fields, and (b) moveable mechanical and magnetic means operative when said electrically energizable means is deenergized to lock said indicator member in said first display position and operative when said electromagnetic means is energized to unlock said indicator member for rotational movement and to concentrate each of said fields whereby said indicator member is magnetically impelled to one or the other of said second and third display positions according to which of said magnetic fields is established.

3. A three-position indicator comprising an indicator member mounted for rotation on a first selected axis, said indicator member having permanent magnet poles, an elongate pole piece mounted for sliding movement between first and second positions along a second axis extending substantially perpendicular to said first axis, said pole piece when moved to said first position locking said indicator member in a first display position and when moved to said second position freeing said indicator member for rotation to two other display positions each determined by engagement of said indicator member with said pole piece, spring means urging said pole piece to said first position, and electromagnetic means for magnetically moving said pole piece to said second position and for magnetically polarizing said pole piece according to either of two opposite magnetic polarity states so as to magnetically impel said indicator member to rotate to one or the other of said two other display positions.

4. A three-position electromagnetic indicator comprising an indicator member having localized North and South magnetic poles, means mounting said indicator member for rotation on a selected axis, and electromagnetic operating means including electrically energizeable means for selectively generating either of two oppositely polarized magnetic fields and magnetically operable means normally locking said indicator member in a first display position on said selected axis, said electrically energizeable means and said magnetically operable means being disposed so that each of said magnetic fields is oriented in a direction to cause said magnetically operable means to unlock said indicator member and to apply a magnetic force of repulsion to one of said poles and simultaneously a magnetic force of attraction to the other of said poles, said poles being spaced radially of said axis so that said forces of repulsion and attraction coact to magnetically impel said indicator member to rotate to a second or third display position according to which of said magnetic fields is generated.

5. An indicator according to claim 4 wherein said magnetically operable means locks said indicator member by mechanical engagement therewith.

6. An indicator according to claim 4 wherein said electrically energizeable means comprises at least one electric coil and said magnetic operable means is a magnetic pole piece disposed so as to be movable away from said indicator member by either of said magnetic fields, and further including means for holding said pole piece in locking engagement with said indicator member when said electrically energizeable means is deenergized.

7. An indicator according to claim 4 wherein said magnetically operable means comprises a magnetic core and spring means biasing said core in a first direction, and said electrically energizeable means includes a solenoid disposed so that when energized its resulting magnetic field will produce a magnetic force on said core sufficient to overcome said spring means and move said core in a second opposite direction.

8. A three-position indicator comprising: an indicator member; means rotatably supporting said indicator member so that by rotation said indicator member can assume any one of two extreme positions and a third position intermediate said two extreme positions; said indicator member being adapted to provide three visual signals, one in each of said extreme and intermediate positions; a reciprocal armature; spring means normally biasing said armature in a first direction so that said armature normally engages said indicator member and holds said indicator member in said intermediate position; and electromagnetic means for (a) magnetically moving said armature in a second opposite direction so as to free said indicator member for rotation to either of said two extreme positions and (b) selectively inducing either of two substantially steady state magnetic fields of opposite polarity in said armature; said indicator member having a pair of localized magnetic poles of opposite polarity disposed so that one of said poles is magnetically repulsed by and the other of said poles is magnetically attracted to said armature when said armature is magnetized by one of said fields, whereby to cause rotation of said indicator member to one or the other of said extreme positions according to the polarity of the magnetic field induced in said armature.

9. An indicator according to claim 8 further including means limiting the extent of movement of said armature in said second opposite direction.

10. An indicator according to claim 8 wherein said indicator member is mounted for rotation on an axis extending at a right angle to the longitudinal axis of said armature and said extreme positions are determined by engagement of different portions of said indicator member with said armature.

11. An indicator according to claim 8 wherein said armature is reciprocal along a straight line axis and said indicator member is mounted for rotation on an axis extending at a right angle to said straight line axis.

12. An indicator according to claim 11 wherein the said axis of rotation of said indicator member is perpendicular to said straight line axis.

13. An indicator according to claim 12 wherein said localized magnetic poles are spaced radially of the axis of rotation of said indicator member.

14. An indicator member according to claim 8 wherein said indicator member includes a permanent magnet characterized by said localized magnetic poles, with the magnetic field axis of said magnet extending transversely of the axis of rotation of said indicator member.

15. An indicator member according to claim 8 wherein said indicator member is a drum having a flat surface; and further wherein said armature is disposed so as to engage one portion of said surface when said indicator member is in said intermediate position and different portions of said surface when said indicator member is rotated to either of said extreme positions.

16. An indicator member according to claim 15 wherein one end of said armature member engages said flat surface, said one end comprising a first flat end surface portion for engaging said indicator member in said intermediate position and second and third inclined side surface portions for engaging said indicator member in said extreme positions.

17. An indicator member according to claim 8 wherein said electromagnetic means comprises at least one coil surrounding said armature; and means for electrically energizing said at least one coil so as to selectively generate either of said substantially steady state magnetic fields of opposite polarity.

18. An indicator member according to claim 2 wherein said moveable mechanical and magnetic means comprises a reciprocally moveable armature adapted to mechanically lock said indicator member when said electromagnetic means is deenergized and to unlock said indicator member when said electromagnetic means is energized.

* * * * *